(12) United States Patent
Barlow et al.

(10) Patent No.: US 9,084,099 B2
(45) Date of Patent: *Jul. 14, 2015

(54) MEDIATION AND PRESENTATION OF COMMUNICATIONS

(71) Applicant: International Business Machines Corporation, Armonk, NY (US)

(72) Inventors: William C. Barlow, Newburyport, MA (US); Muhammed F. Bulut, Kemore, NY (US); James E. Christensen, Cortlandt Manor, NY (US); David S. Marshak, Wrentham, MA (US); Andrew L. Schirmer, Andover, MA (US); Amy D. Travis, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/952,727

(22) Filed: Jul. 29, 2013

(65) Prior Publication Data

US 2013/0344854 A1    Dec. 26, 2013

Related U.S. Application Data

(63) Continuation of application No. 13/532,501, filed on Jun. 25, 2012.

(51) Int. Cl.
*G06F 17/30* (2006.01)
*H04W 4/16* (2009.01)
(Continued)

(52) U.S. Cl.
CPC ............... *H04W 4/16* (2013.01); *H04L 29/06* (2013.01); *H04W 4/206* (2013.01)

(58) Field of Classification Search
CPC .................. H04L 29/06; H04L 29/08072
USPC ........... 709/203, 220, 224, 228, 204; 455/415
See application file for complete search history.

(56) References Cited

U.S. PATENT DOCUMENTS

| 7,236,577 | B2 | 6/2007 | Lection et al. |
| 7,917,587 | B2 | 3/2011 | Zeng et al. |
| 8,020,191 | B2 * | 9/2011 | Bertino et al. ............ 726/1 |

(Continued)

OTHER PUBLICATIONS

"App Store—Where Are My Friends"; iTunes; Copyright 2011 Application, Inc.; date printed Feb. 8, 2012; <http://itunes.apple.com/us/app/where-are-my-friends/id468952436?mt=8>.

(Continued)

*Primary Examiner* — Khanh Dinh
(74) *Attorney, Agent, or Firm* — Ian A. McKee; Edward J. Wixted, III

(57) ABSTRACT

A computer receives a plurality of records each relevant to a relationship between a first person and a second person. The computer determines a communication score of a communication from the first person to the second person, wherein the score is based on at least one of the plurality of records. The computer compares the communication score to an established mediation threshold. Responsive to determining that the communication score violates the established mediation threshold, the computer passes the communication to a user device of the second person. Further, the computer prioritizes the plurality of records according to a set of priorities, and presents the plurality of records to the first person or to the second person.

12 Claims, 5 Drawing Sheets

(51) Int. Cl.
*H04L 29/06* (2006.01)
*H04W 4/20* (2009.01)

(56) References Cited

U.S. PATENT DOCUMENTS

| | | | |
|---|---|---|---|
| 8,291,492 B2* | 10/2012 | McNally et al. | 726/21 |
| 8,677,487 B2 | 3/2014 | Balupari et al. | |
| 8,776,225 B2 | 7/2014 | Pierson et al. | |
| 2007/0206747 A1 | 9/2007 | Gruchala et al. | |
| 2009/0136013 A1 | 5/2009 | Kuykendall et al. | |
| 2009/0282104 A1 | 11/2009 | O'Sullivan et al. | |
| 2010/0161662 A1 | 6/2010 | Jonas et al. | |
| 2010/0318613 A1 | 12/2010 | Souza et al. | |
| 2012/0143924 A1 | 6/2012 | Sethi et al. | |
| 2012/0203869 A1* | 8/2012 | Caruso et al. | 709/219 |
| 2013/0039182 A1 | 2/2013 | Das et al. | |
| 2013/0097282 A1* | 4/2013 | Svendsen | 709/217 |
| 2013/0217364 A1 | 8/2013 | Varoglu et al. | |
| 2013/0247224 A1 | 9/2013 | Karlson et al. | |
| 2013/0262311 A1* | 10/2013 | Buhrmann et al. | 705/44 |
| 2013/0268994 A1* | 10/2013 | Cooper et al. | 726/1 |
| 2013/0297699 A1* | 11/2013 | Yoshida et al. | 709/204 |

OTHER PUBLICATIONS

"BlazeCase—Benbria"; Benbria-Rethink Notification; Copyright 2007-2012 Benbria; date printed Feb. 8, 2012; <http://www.benbria.com/products/blazecast>.

"Download Voicemail, Call attendant and IVR Software for Windows", IVM Answering Attendant Software; NCH Software; date printed Feb. 3, 2012; <http://www.nch.com/au/ivm/index.html>.

"Foursquare"; date printed Feb. 3, 2012; <http://foursquare.com/#demoVideo>.

"Northern Communications—Intelligent Answering Service"; Northern Communications; date printed Feb. 3, 2012; <http://www.northerncom.com/intelligent_answering.php>.

"Vitual Receptionist, Remote Receptionist Services, Virtual Office Assistant, Telephone Answering Service, Phone Answering Service"; Copyright 2012 Intelligent Office, date printed Feb. 3, 2012; http://www.intelligentoffice.com/services/intelligent-assistant.aspx>.

"What is IN? MIR3 Mass Notification Solution"; Copyright MIR3, Inc.; date printed Jan. 27, 2012; <http://www.mir3.com/intelligent-nofitifcation>.

U.S. Appl. No. 13/532,501, entitled "Mediation and Presentation of Communications" filed Jun. 25, 2012.

* cited by examiner

| RECORD TYPES | CLOSE RELATIONSHIP MODE | DISTANT RELATIONSHIP MODE |
|---|---|---|
| EMAIL SERVER RECORD PRIORITY | 3 | 3 |
| SOCIAL NETWORKING SERVER RECORD PRIORITY | 1 | 2 |
| ELECTRONIC DIRECTORY SERVER RECORD PRIORITY | 2 | 2 |
| INSTANT MESSAGING SERVER RECORD PRIORITY | 3 | 1 |
| SHARING SERVER RECORD PRIORITY | 2 | 2 |
| FORUM SERVER RECORD PRIORITY | 3 | 2 |
| BLOG SERVER RECORD PRIORITY | 3 | 2 |
| COMPANY INTRANET SERVER RECORD PRIORITY | 1 | 1 |
| CALENDAR SERVER RECORD PRIORITY | 1 | 1 |

FIG. 2A

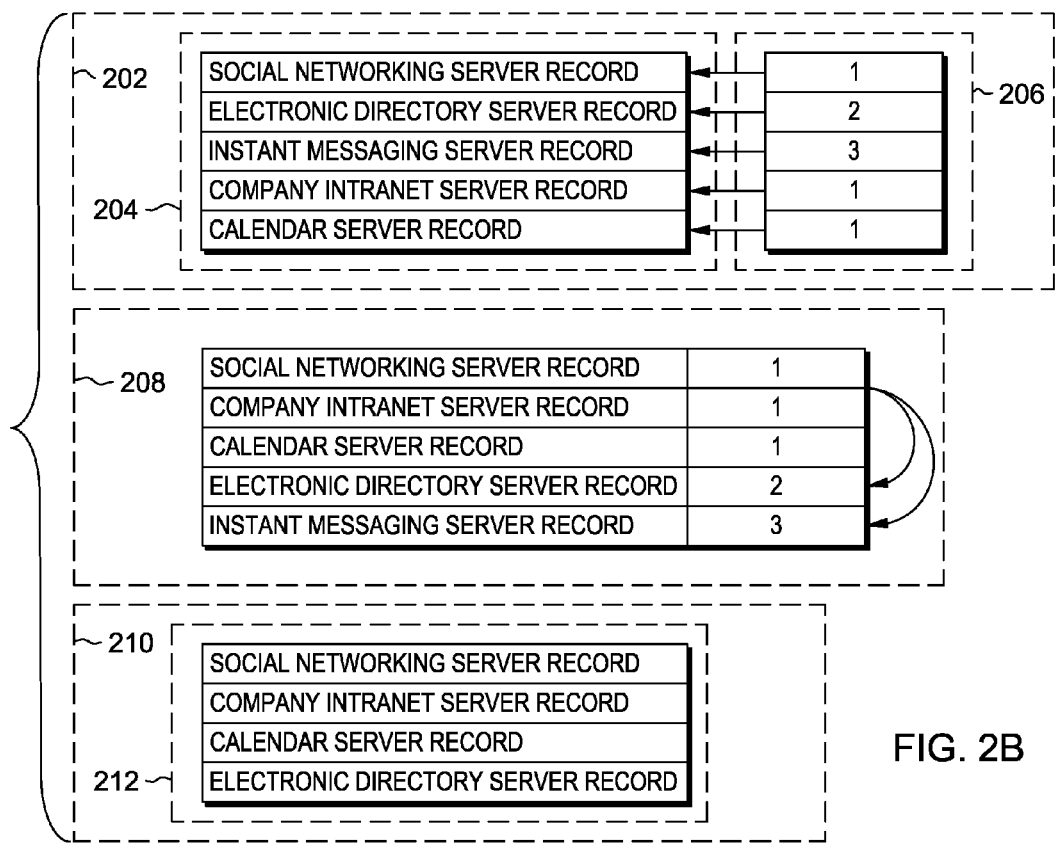

FIG. 2B

MEDIATION AND PRESENTATION OF COMMUNICATIONS

CROSS REFERENCE TO RELATED APPLICATION

This application is a continuation of U.S. patent application Ser. No. 13/532,501 filed Jun. 25, 2012 the entire content and disclosure of which is incorporated herein by reference.

FIELD OF THE INVENTION

The present invention relates generally to communication systems, and more particularly to mediation and presentation of communications utilizing multiple data sources.

BACKGROUND

The use of communication channels of many types has increased greatly, given the recent proliferation of communication technologies. Similarly, the use of social, business, and personal networking services has also increased greatly. Communication channels in widespread use include, for example, telephone voice channels, cellular phone text message channels, computerized instant messaging channels, electronic mail channels, and so on. It is often the case that a given person is able to use a given communication channel in multiple ways. For example, a given person may have a business phone number and a cell phone number, or may have multiple email addresses. It is often the case that one person wants to communicate with another immediately or very soon, to give or receive information or to otherwise collaborate in a timely fashion. Channels that enable such communications can be referred to as real-time communication channels. Typically, one person will attempt to contact another using a real time communication channel, and the person being contacted can decide whether to respond. As communication services and technology evolve, the number of alternate communication channels that people use to contact each other grows. Additionally, the number of social, business, and personal networking services also grows. As such, the burden of monitoring and managing all of the possible communication channels and social, business, and personal networking services, with their attendant devices and interfaces, grows ever greater.

Several current solutions attempt to coordinate the many alternate communication channels and the social, business, and personal networking services to alleviate the burden of monitoring and managing the coordinated channels and services. For example, unified communications solutions involve the integration of real-time communication services such as instant messaging, presence information, telephony, and video conferencing with non-real-time communication services such as unified messaging (integrated voicemail, email, text messaging, and fax). Unified communications solutions typically involve multiple products that attempt to provide a unified user interface and user experience. Unified communications solutions can allow a person to send a message on one medium and receive the same communication on another medium. For example, a person can receive a voicemail message and choose to access it through e-mail or a cell phone. If the sender of the voicemail message is online, according to the sender's presence information, and available to currently accept calls, the response to the voicemail can be sent immediately through text chat or video call. Alternatively, it may be sent as a non real-time message that can be accessed through a variety of media. Unfortunately, no current solution adequately alleviates the burden of monitoring and managing multiple coordinated channels and services.

SUMMARY

Embodiments of the present invention provide for a program product, system, and method in which a computer receives a plurality of records each relevant to a relationship between a first person and a second person. The computer determines a communication score of a communication from the first person to the second person, wherein the score is based on at least one of the plurality of records. The computer compares the communication score to an established mediation threshold. Responsive to determining that the communication score violates the established mediation threshold, the computer passes the communication to a user device of the second person. Further, the computer prioritizes the plurality of records according to a set of priorities, and presents the plurality of records to the first person or to the second person.

BRIEF DESCRIPTION OF THE SEVERAL VIEWS OF THE DRAWINGS

FIG. 2A is a diagram of table 200 which includes priorities for a variety of records in a close relationship mode and a distant relationship mode in accordance with an embodiment of the present invention.

FIG. 2B is a depiction of several steps taken by caller presentation program 144 or recipient presentation program 146 to prepare a presentation of status in accordance with an embodiment of the present invention.

DETAILED DESCRIPTION

Figure 1:
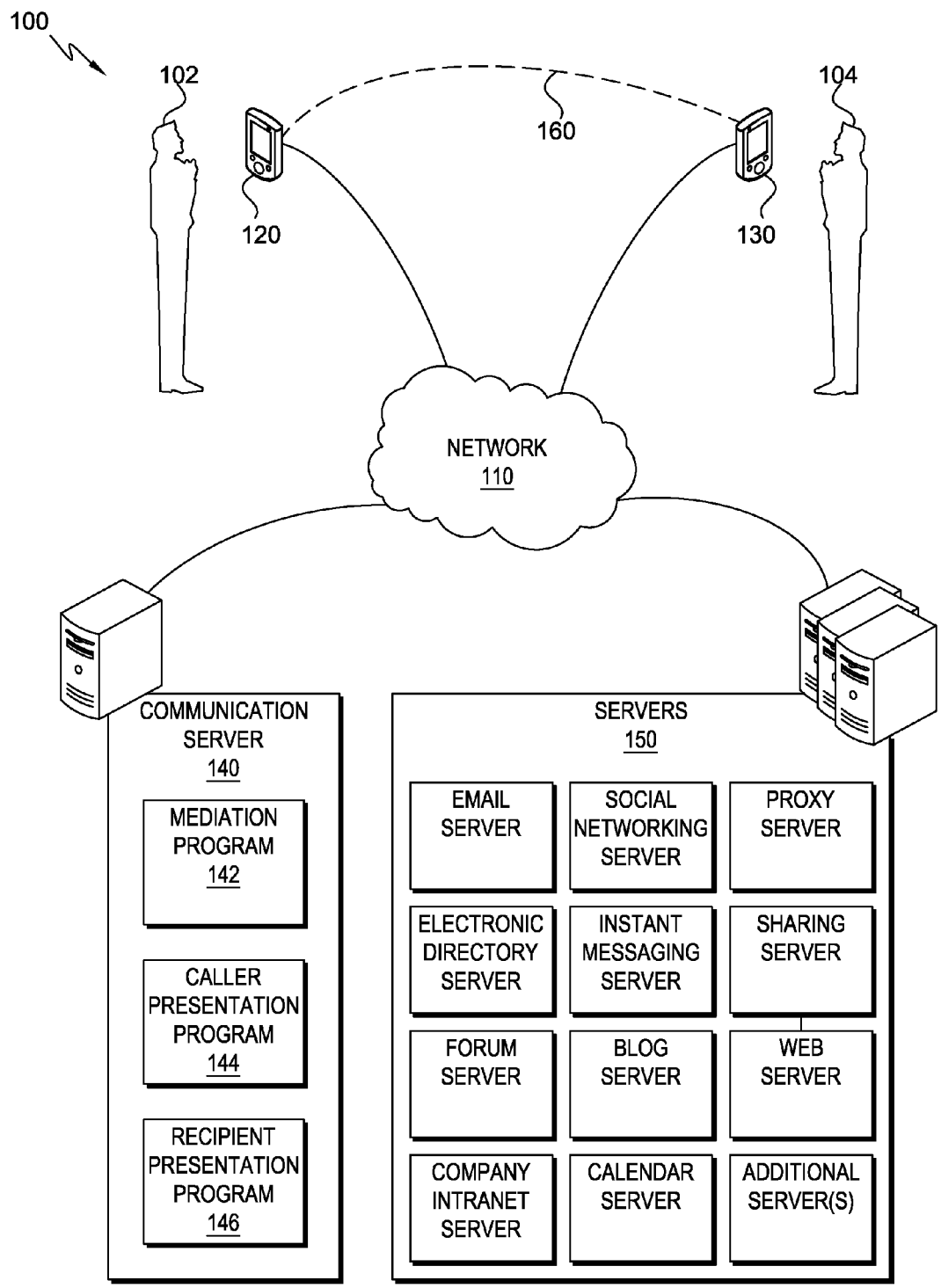
FIG. 1 is a functional block diagram of communications system 100 in accordance with an embodiment of the present invention.

FIG. 1 depicts a functional block diagram of communications system 100 in accordance with an illustrative embodiment of the present invention. Communications system 100 includes network 110, user device 120, user device 130, communication server 140, and servers 150. Network 110 can be, for example, a local area network (LAN), a wide area network (WAN) such as the Internet, or a combination of the two, and can include wireline or wireless connections. In general, network 110 can be any combination of connections and protocols that will support communications via various channels between user device 120, user device 130, communication server 140, and servers 150 in accordance with an embodiment of the invention. Persons 102 and 104 can use communications system 100 to communicate with each other, mediate communications, and be notified of communications as described below.

In various embodiments, each of communication server 140 and servers 150 can include a laptop, tablet, or netbook personal computer (PC), a desktop computer, a personal digital assistant (PDA), a smart phone, a mainframe computer, or a networked server computer. Further, communication server 140 and servers 150 can represent computing systems utilizing clustered computers and components to act as single pools of seamless resources when accessed through network 110, or can represent one or more cloud computing datacenters. Further, servers 150 can include multiple devices and functions under the control and direction of multiple entities. In general, each one of communication server 140 and servers 150 can include any programmable electronic device as described in further detail with respect to FIG. 5.

User device 120 and user device 130 can include in various embodiments a laptop, tablet, or netbook personal computer (PC), a desktop computer, a personal digital assistant (PDA), a cellular phone, a mobile phone, a smart phone, a conference phone, a speaker phone, a computer with a resident software phone, or any other type of communication device that can exchange voice signals, exchange and process data, or both. User device 120 and user device 130 are each able to transmit and receive voice signals, data signals, or both to and from each other and to and from communication server 140, servers 150, or both. In general, each one of user device 120 and user device 130 can include any programmable electronic device as described in further detail with respect to FIG. 5.

User device 120 includes mediation program 142, caller presentation program 144, and recipient presentation program 146. Programs 142, 144, and 146 can operate to provide persons 102 and 104 with mediation and notification of communications for all attempts to communicate. Exemplary communication 160 is depicted as a message transmitted from user device 120 to user device 130. Although communication 160 is depicted as travelling directly from user device 120 to user device 130 in FIG. 1, it should be understood that communication 160 actually travels, in various embodiments, via network 110 and various intermediary servers, including communication server 140 and servers 150. Communication 160 can involve one of many different kinds of attempts to communicate For example, in one embodiment communication 160 includes person 102 attempting to send person 104 an email message by composing the email message on user device 120 and sending it to an email server of servers 150. The email server of servers 150 receives the email message and stores it in association with an account of person 104. User device 130 uses the email username and password of person 104 to log in to the email server of servers 150 and retrieve the email message. In another embodiment, in which servers 150 includes a social networking server, communication 160 is a social networking account message. In this embodiment, user device 130 uses the social networking username and password of person 104 to log in to the social networking server of servers 150 and indicate that person 104 is present and available to receive messages on servers 150. The social networking server of servers 150 receives communication 160 and stores it in association with an account of person 104, and user device 130 retrieves attempt to communicate 160. In another embodiment, user device 130 can retrieve communication 160 from an email server or a social networking server of servers 150 indirectly, with the assistance of a proxy server. In another embodiment, communication 160 includes person 102 attempting to send person 104 an SMS message by composing the SMS message on user device 120 and sending it to user device 130. In yet another embodiment communication 160 includes person 102 attempting to call person 104 by dialing a phone number associated with user device 130 on user device 120.

Each distinct account (e.g., an email account, social networking account, or another account used for communication) used for the transmission of communication 160 can be regarded as a channel for making an attempt at communication. Each distinct phone number (e.g., the phone number of user device 120, user device 130, or another phone number used for communication) used for the transmission of communication 160 can also be regarded as a channel for making an attempt at communication. Further, any distinct mode of communication or distinction made to distinguish a communication endpoint can be regarded as a channel for making communication 160.

In one embodiment, communication 160 includes full message content. For example, communication 160 can include an entire email message, an entire social networking account message, or an entire SMS message. In another embodiment, communication 160 does not include full message content, and instead include a notification that full message content is available elsewhere. For example, communication 160 can include a notification that an entire email message or an entire social networking account message is available for retrieval on a server of servers 150. Similarly, communication 160 can include a notification that an entire SMS message is available for retrieval on a cell phone network internal to network 110, for example. If communication 160 is an attempt at communication via a phone call, then communication 160 will not include message content, and instead will include a notification that user device 120 is available to open a voice connection with user device 130, for example.

Mediation program 142 intercepts communication 160 to identify the caller, for example person 102, and assemble contextual information relating to person 102 and further relating to, or relevant to, the relationship person 102 has with the recipient, for example person 104. Mediation program 142 can intercept communication 160 in several ways. For example, in one embodiment, person 104 can register user device 130 with communication server 140, so that communication 160 is redirected from user device 130 to communication server 140 for analysis. In another embodiment, person 104 can establish a communication account on communication server 140 and instruct all callers to send communication 160 directly to communication server 140. After intercepting communication 160 and assembling contextual information, mediation program 142 determines a communication score and compares the communication score to a threshold. Based on the comparison, mediation program 142 decides whether and how to pass communication 160 to person 104, as discussed in detail below.

Mediation program 142 determines available information about person 102, which can vary according to the channel utilized to transmit communication 160, for example. The determined information can include a telephone number of user device 120, or a login identity of person 102 used to transmit an email message version of communication 160, for example. Mediation program 142 then assembles contextual information by correlating the determined information with existing records from other data sources within servers 150, such as public data sources or data sources accessible by person 104, user device 130, communication server 140, or a combination of these. In one embodiment, the existing records from other data sources within servers 150 can also or instead be located on one or both of user device 120 and user device 130. By correlating the determined information with the existing records, mediation program 142 determines additional identity information about person 102 and assembles contextual information relating to, or relevant to, the relationship person 102 has with person 104.

For example, mediation program 142 can access existing records from a social networking server within servers 150, to determine whether person 102 has a relationship with person 104 on the social network. For example, the existing records may show that person 102 and person 104 have "friended" each other on the social network, or may show the degree of separation of person 102 and person 104 on the social network.

Mediation program 142 can also access existing records from an electronic directory server within servers 150 to determine whether person 102 and person 104 are in the electronic directory. For example, the existing records may show that person 102 and person 104 work in the same workplace or live in the same city, or that person 102 and person 104 share a personal connection or a business connection.

Mediation program 142 can also access existing records of the communication history of person 102 and person 104, stored on various servers within servers 150. For example, the existing records can include prior emails, phone calls, SMS messages, social networking messages, and instant messages, and may show that person 102 and person 104 have communicated in the past. These may also show the degree of privacy in the relationship between person 102 and person 104, such that if person 102 and person 104 typically have shared communications in a large group (for example, by using a "cc all" function of an email server, or a group chat function of an instant messaging server) they might not have as close a relationship as they would if they typically communicated in smaller groups or one-on-one.

Mediation program 142 can also access existing records of the sharing history of person 102 and person 104, stored on a sharing server within servers 150. For example the existing records can include file sharing records of a peer-to-peer file sharing network, or of an enterprise storage area network, or of a workplace file sharing protocol, which may show that person 102 and person 104 have shared files, electronic documents, or other data in the past.

Mediation program 142 can also access existing records of the common posting and commenting history of person 102 and person 104, stored on a forum server or a blog server within servers 150. For example the existing records can include internet forum posting records, blog posting records, and comment posting records. These may show that person 102 and person 104 have posted comments on each other's blogs, or have posted in the same internet forum, for example.

Mediation program 142 can also access existing records of the group and community affiliations of person 102 and person 104, stored on a web server within servers 150. For example the existing records can include interest-related group or community website records. These may show that person 102 and person 104 have shared interests, hobbies, and educational histories, for example.

Mediation program 142 can also access existing records of the workplace affiliations of person 102 and person 104, stored on a company intranet server within servers 150. For example the existing records can include company organizational chart records. These may show that person 102 and person 104 have an employee-employer relationship, or an employer-employee relationship, a board of directors to corporate officer relationship, or another type of business relationship, for example.

Mediation program 142 can also access existing records of the calendaring software of person 102 and person 104, stored on a calendar server within servers 150. For example the existing records can include scheduled meetings, scheduled appointments, or scheduled holidays. These may show that person 102 and person 104 have a shared future calendar meeting, a shared past calendar meeting, or a shared holiday, for example. These may also show the degree of privacy in the relationship between person 102 and person 104, such that if person 102 and person 104 typically have scheduled meetings in a large group, they might not have as close a relationship as they would if they typically met in smaller groups or one-on-one.

Mediation program 142 can access existing records as described above completely or incompletely, in a specific order, or in an order determined dynamically during progress, as appropriate. For each instance of communication 160, the resulting assembled contextual information can range from very sparse, such that no additional information is located besides the determined information that was included in communication 160, suggesting that person 102 and person 104 have a distant relationship, to very rich, suggesting that person 102 and person 104 are very well acquainted and have a close relationship.

Having intercepted communication 160 and assembled contextual information as discussed above, mediation program 142 determines a communication score utilizing the assembled contextual information as well as a set of conditions. The conditions may be established manually in advance by person 102 or person 104, in advance by mediation program 142, or dynamically by mediation program 142 according to analysis of past preferences or behavior of person 102 or person 104. The conditions may include a current context of person 102 or person 104. For example, a current context includes whether person 104 is on the telephone or in a meeting, or if it is the usual lunch time of person 104, or if person 104 is working toward a deadline, or if person 104 has accepted or rejected previous attempts at communication by person 102. In particular, the communication score can be determined to be the sum of the strengths of the relationship between person 102 and person 104, as deduced by analysis of the assembled contextual information, minus the sum of the strengths of any negative-implication conditions. For example, if the assembled contextual information sum results in a large positive score, and the sum of the strengths of any negative-implication conditions results in a small positive score, then the yielded communication score may still be itself positive. Mediation program 142 compares the communication score to an established mediation threshold, and if the communication score exceeds the mediation threshold, mediation program 142 passes communication 160 to person 104. The mediation threshold may be established by default, by a user preference, or automatically by mediation program 142.

In one embodiment, if the communication score is below the mediation threshold because of a low sum of the strengths of the relationship between person 102 and person 104 deduced by analysis of the assembled contextual information, then mediation program 142 can prompt person 102 for additional contextual information prior to rejecting communication 160. After receiving additional contextual information, mediation program 142 recalculates the communication score and tests it against the mediation threshold again, to increase the opportunity of person 102 to communicate with person 104.

Having discussed mediation program 142, discussion turns now to caller presentation program 144. Caller presentation program 144 uses what is known about a caller and a recipient, for example person 102 and person 104, to make a presentation of status to the caller, either contemporaneously with communication 160, or prior to communication 160. Caller presentation program 144 also uses what is known to decide what information is presented to the caller, and how that information is presented, in order to most efficiently and effectively help the caller decide whether to complete or to make the call.

Caller presentation program 144 makes decisions about presentation of status based on the types and quantity of data provided by other systems, such as the assembled contextual information gathered from existing records from other data sources within servers 150. Additionally, caller presentation program 144 may use that data to create additional information for presentation.

In one embodiment the information used to make a presentation of status to the caller is current, automatic, and relevant to the relationship between the caller and the recipient, and as such the presentation enhances the ability of the caller to correctly judge suitability of contact and the likelihood of a response by the recipient. Therefore, callers make fewer failed attempts at communication, callers find better recipients, recipients do less work providing and maintaining status information to potential callers, and both callers and recipients experience fewer unnecessary interruptions and less time lost.

Caller presentation program 144, contemporaneously with or prior to the initiation of communication 160, can assemble contextual information relating to person 102 and further relating to, or relevant to, the relationship person 102 has with the recipient, for example person 104. Caller presentation program 144 can begin assembly of the contextual information in several ways. For example, in one embodiment, person 102 can register user device 120 with communication server 140, so that caller presentation program 144 is contacted automatically when person 102 initiates communication 160. In another embodiment, person 102 can establish a communication account on communication server 140 and initiate communication 160 directly from communication server 140. After assembling contextual information, caller presentation program 144 makes a presentation of status to person 102, as discussed in detail below.

Caller presentation program 144 determines available information about person 104, which can vary according to the channel being utilized, or that will be utilized, to transmit communication 160, for example. The determined information can include a telephone number of user device 130, or a login identity of person 104 used to receive an email message version of communication 160, for example. Caller presentation program 144 then assembles contextual information by correlating the determined information with existing records from other data sources within servers 150, such as public data sources or data sources accessible by person 102, user device 130, communication server 140, or a combination of these. In one embodiment, the existing records from other data sources within servers 150 can also or instead be located on one or both of user device 120 and user device 130. By correlating the determined information with the existing records, caller presentation program 144 determines additional identity information about person 104 and assembles contextual information relating to, or relevant to, the relationship person 102 has with person 104.

Caller presentation program 144 can access existing records as described above in the context of mediation program 142. Further, caller presentation program 144 can access existing records as described above completely or incompletely, in a specific order, or in an order determined dynamically during progress, as appropriate. For each instance of communication 160 contemplated or actually initiated by person 102, the resulting assembled contextual information can range from very sparse, such that no additional information is located besides the determined information that was included in communication 160, suggesting that person 102 and person 104 have a distant relationship, to very rich, suggesting that person 102 and person 104 are very well acquainted and have a close relationship.

Having assembled contextual information as discussed above, caller presentation program 144 determines a communication score utilizing the assembled contextual information as well as a set of conditions. The conditions may be established manually in advance by person 102 or person 104, in advance by caller presentation program 144, or dynamically by caller presentation program 144 according to analysis of past preferences or behavior of person 102 or person 104. The conditions may include a current context of person 102 or person 104. For example, a current context includes whether person 104 is on the telephone or in a meeting, or if it is the usual lunch time of person 104, or if person 104 is working toward a deadline, or if person 104 has accepted or rejected previous attempts at communication by person 102. In particular, the communication score can be determined to be the sum of the strengths of the relationship between person 102 and person 104, as deduced by analysis of the assembled contextual information, minus the sum of the strengths of any negative-implication conditions. For example, if the assembled contextual information sum results in a large positive score, and the sum of the strengths of any negative-implication conditions results in a small positive score, then the yielded communication score may still be itself positive. Caller presentation program 144 compares the communication score to an established presentation threshold, and if the communication score exceeds the presentation threshold, caller presentation program 144 determines that a presentation of status to person 102 should be performed in a close relationship mode. However, if the communication score does not exceed the presentation threshold, caller presentation program 144 determines that a presentation of status to person 102 should be performed in a distant relationship mode. Presentations of status according to close relationship mode and distant relationship mode will be discussed in detail below. The presentation threshold may be established by default, by a user preference, or automatically by caller presentation program 144.

FIG. 2A depicts table 200, which includes priorities for a variety of records in a close relationship mode and a distant relationship mode in accordance with an embodiment of the present invention. In order to prepare a presentation of status to person 102, caller presentation program 144 utilizes table 200 to look up a priority for each existing record gathered while assembling contextual information. Table 200 includes at least one priority, per mode, for each type of record that can be gathered. For example, table 200 includes the priority "1" for social networking server records while operating in a close relationship mode, and the priority "2" for social networking server records while operating in a distant relationship mode. Each priority included in table 200 can be determined by, for example, use case analysis. In another embodiment, each priority can be determined, for example, by according higher priority for records retrieved from external data sources (for example, data sources external to the workplace of person 102 or person 104), or by according higher priority for records unlikely to already be known by person 102. Each priority included in table 200 can be determined to assist person 102 in judging the likelihood of a response by the recipient. In various embodiments, more or fewer record types can be included, and more or fewer modes can be included.

FIG. 2B depicts several steps taken by caller presentation program 144 to prepare a presentation of status to person 102.

In priority association step 202, caller presentation program 144 associates a set of priorities 206 with a set of existing records 204 gathered while assembling contextual information. The set of priorities 206 are selected for the set of existing records 204 from a mode column of table 200, according to whether or not the communication score exceeded the presentation threshold. For example, for a given communication 160 in which caller presentation program 144 determined that a presentation of status to person 102 should be performed in a close relationship mode because the communication score did exceed the presentation threshold, caller presentation program 144 then selects the set of priorities 206 from the close relationship mode column. In record sorting step 208, caller presentation program 144 sorts existing records 204 and associated priorities 206 according to the priorities 206. In presentation step 210, caller presentation program 144 finalizes preparation of a presentation of status to person 102 by culling a number of sorted records, if necessary, to yield presentable records 212. For example, presentable records 212 include four remaining records, after culling an instant messaging server record. In one embodiment, the instant messaging server record has been culled because it has the lowest priority amongst existing records 204. In another embodiment, the instant messaging server record has been culled according to a user preference of person 102 to always cull records having a priority lower than "1" or "2." In yet another embodiment, the instant messaging server record has been culled because presentable records 212 is limited to a maximum number of records (for example, four records) because of user interface display constraints of user device 120, or limited to a variable number of records because of user interface display constraints of corresponding user devices.

Caller presentation program 144 has, as discussed above, in one embodiment gathered a set of existing records while assembling contextual information, generated a communication score for communication 160 based on the assembled contextual information, selected a mode for making a presentation of status to person 102 based on the communication score, and prepared presentable records 212 for presentation to person 102. Subsequently, caller presentation program 144 can transmit presentable records 212, either contemporaneously with communication 160, or prior to communication 160, to user device 120 to efficiently and effectively help person 102 decide whether to complete or to make communication 160. For example, person 102 can view presentable records 212 on user device 120, and determine based on a social networking server record that he or she has recently "friended" person 104, based on a company intranet server record that he or she has not yet sent an important, relevant file to person 104, based on a calendar server record that he or she has ten minutes left until a scheduled conference call with person 104, and based on an electronic directory server record that person 104 has update his or her contact information. Based on these determinations, person 102 can delay initiating communication 160 until sending the important, relevant file and waiting until the scheduled conference call time.

Having discussed caller presentation program 144, discussion turns now to recipient presentation program 146, depicted in FIG. 1. Recipient presentation program 146 uses what is known about a caller and a recipient, for example person 102 and person 104, to make a presentation of status to the recipient, contemporaneously with communication 160. The operation of recipient presentation program 146 shares several features with the operation of caller presentation program 144, and the discussion below will highlight similarities and differences. Recipient presentation program 146 uses what is known to decide what information is presented to the recipient, and how that information is presented, in order to most efficiently and effectively help the recipient decide whether to take the call.

Recipient presentation program 146 makes decisions about presentation of status based on the types and quantity of data provided by other systems, such as the assembled contextual information gathered from existing records from other data sources within servers 150. Additionally, recipient presentation program 146 may use that data to create additional information for presentation.

In one embodiment the information used to make a presentation of status to the recipient is current, automatic, and relevant to the relationship between the caller and the recipient, and as such the presentation enhances the ability of the recipient to correctly judge suitability of contact and the utility of taking the call. Therefore, callers make fewer failed attempts at communication, callers find better recipients, recipients do less work providing and maintaining status information to callers, and both callers and recipients experience fewer unnecessary interruptions and less time lost.

Recipient presentation program 146, contemporaneously with the initiation of communication 160, can assemble contextual information relating to person 102 and further relating to, or relevant to, the relationship person 102 has with the recipient, for example person 104. Recipient presentation program 146 can begin assembly of the contextual information in several ways. For example, in one embodiment, person 104 can register user device 130 with communication server 140, so that recipient presentation program 146 is contacted automatically when person 102 initiates communication 160. In another embodiment, person 104 can establish a communication account on communication server 140 and receive communication 160 directly from communication server 140. After assembling contextual information, recipient presentation program 146 makes a presentation of status to person 104, as discussed in detail below.

Recipient presentation program 146 determines available information about person 102, which can vary according to the channel being utilized, or that will be utilized, to transmit communication 160, for example. The determined information can include a telephone number of user device 120, or a login identity of person 102 used to receive an email message version of communication 160, for example. Recipient presentation program 146 then assembles contextual information by correlating the determined information with existing records from other data sources within servers 150, such as public data sources or data sources accessible by person 104, user device 130, communication server 140, or a combination of these. In one embodiment, the existing records from other data sources within servers 150 can also or instead be located on one or both of user device 120 and user device 130. By correlating the determined information with the existing records, recipient presentation program 146 determines additional identity information about person 102 and assembles contextual information relating to, or relevant to, the relationship person 102 has with person 104.

Recipient presentation program 146 can access existing records as described above in the contexts of mediation program 142 and caller presentation program 144. Further, recipient presentation program 146 can access existing records as described above completely or incompletely, in a specific order, or in an order determined dynamically during progress, as appropriate. For each instance of communication 160 initiated by person 102, the resulting assembled contextual information can range from very sparse, such that no additional information is located besides the determined information that was included in communication 160, suggesting that person 102 and person 104 have a distant relationship, to very rich, suggesting that person 102 and person 104 are very well acquainted and have a close relationship.

Having assembled contextual information as discussed above, recipient presentation program 146 determines a communication score utilizing the assembled contextual information as well as a set of conditions. The conditions may be established manually in advance by person 102 or person 104, in advance by recipient presentation program 146, or dynamically by recipient presentation program 146 according to analysis of past preferences or behavior of person 102 or person 104. The conditions may include a current context of person 102 or person 104. For example, a current context includes whether person 104 is on the telephone or in a meeting, or if it is the usual lunch time of person 104, or if person 104 is working toward a deadline, or if person 104 has accepted or rejected previous attempts at communication by person 102. In particular, the communication score can be determined to be the sum of the strengths of the relationship between person 102 and person 104, as deduced by analysis of the assembled contextual information, minus the sum of the strengths of any negative-implication conditions. For example, if the assembled contextual information sum results in a large positive score, and the sum of the strengths of any negative-implication conditions results in a small positive score, then the yielded communication score may still be itself positive. Recipient presentation program 146 compares the communication score to an established presentation threshold, and if the communication score exceeds the presentation threshold, recipient presentation program 146 determines that a presentation of status to person 104 should be performed in a close relationship mode. However, if the communication score does not exceed the presentation threshold, recipient presentation program 146 determines that a presentation of status to person 104 should be performed in a distant relationship mode. The presentation threshold may be established by default, by a user preference, or automatically by recipient presentation program 146.

In order to prepare a presentation of status to person 104, recipient presentation program 146 utilizes table 200, depicted in FIG. 2A and discussed in detail above, to look up a priority for each existing record gathered while assembling contextual information, in a manner similar to caller presentation program 144. In one embodiment, the priorities stored in table 200 are different, for recipient presentation program 146, than the priorities stored in table 200 for caller presentation program 144. Each priority included in table 200, as utilized by recipient presentation program 146, can be determined to assist person 104 in judging the utility of taking the call. Further, recipient presentation program 146 then takes several steps, shown in FIG. 2B and discussed in detail above, to prepare a presentation of status to person 104. For example, in priority association step 202, recipient presentation program 146 associates a set of priorities 206 with a set of existing records 204 gathered while assembling contextual information. In record sorting step 208, recipient presentation program 146 sorts existing records 204 and associated priorities 206 according to the priorities 206. In presentation step 210, recipient presentation program 146 finalizes preparation of a presentation of status to person 104 by culling a number of sorted records, if necessary, to yield presentable records 212.

Recipient presentation program 146 has, as discussed above, in one embodiment gathered a set of existing records while assembling contextual information, generated a communication score for communication 160 based on the assembled contextual information, selected a mode for making a presentation of status to person 104 based on the communication score, and prepared presentable records 212 for presentation to person 104. Subsequently, recipient presentation program 146 can transmit presentable records 212, contemporaneously with communication 160, to user device 130 to efficiently and effectively help person 104 decide whether to take communication 160. For example, person 104 can view presentable records 212 on user device 130, and determine based on a social networking server record that he or she is not a "friend" of person 102 on a social network, based on a company intranet server record that he or she has not ever received a file from person 102, based on a calendar server record that he or she has cancelled several conference calls with person 102 in the past, and based on an electronic directory server record that person 102 has transferred to a distant department. Based on these determinations, person 104 can decline to take communication 160 on the basis that his or her relationship to person 102 is not close enough.

Figure 3:
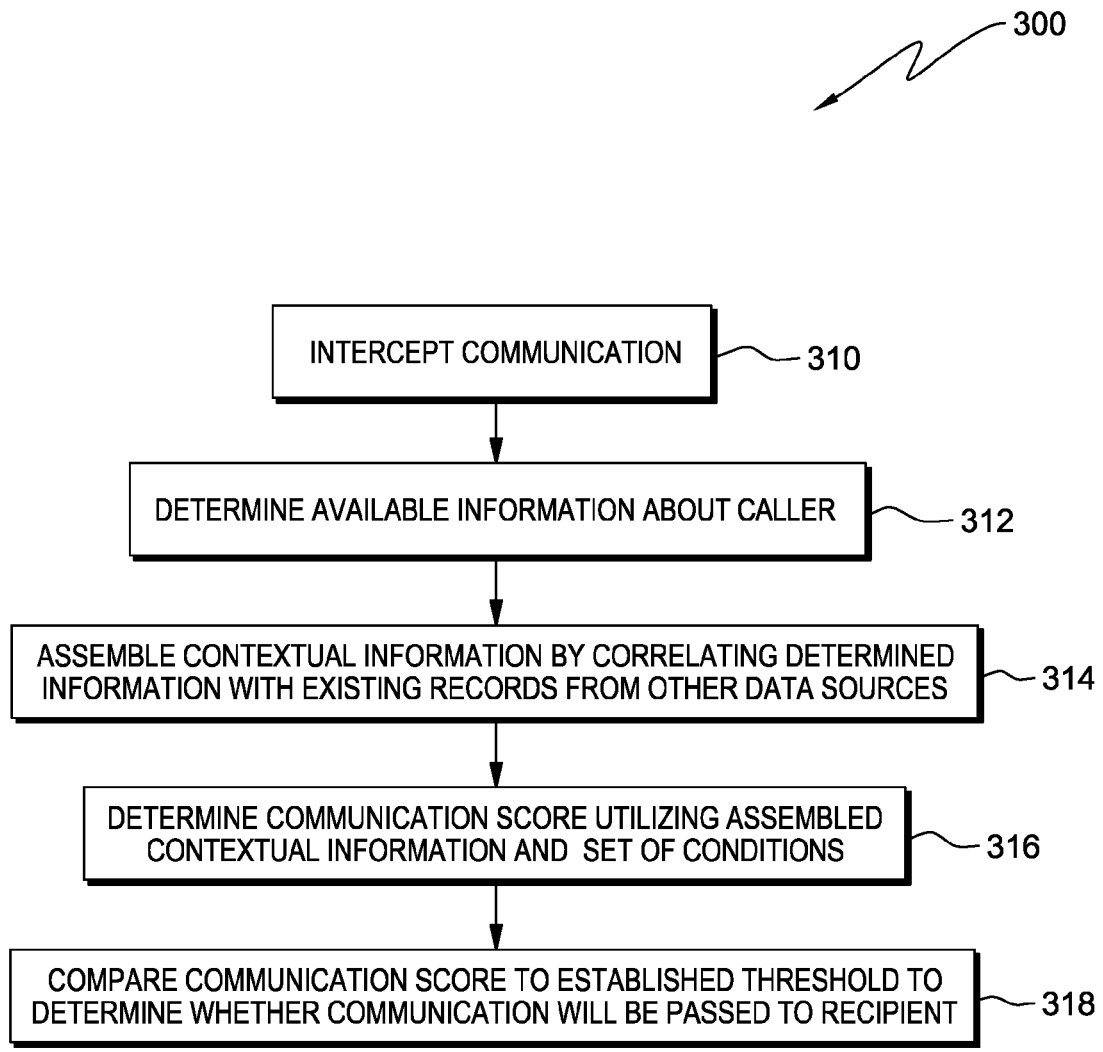
FIG. 3 includes a flowchart depicting steps followed by mediation program 142 in accordance with an embodiment of the present invention.

FIG. 3 includes flowchart 300 depicting steps followed by mediation program 142 in accordance with an embodiment of the present invention. In step 310, mediation program 142 of communication server 140 intercepts a communication, for example communication 160. In step 312, mediation program 142 determines available information about the caller, for example person 102. In step 314, mediation program 142 assembles contextual information by correlating determined information with existing records from other data sources, such as servers within servers 150. In step 316, mediation program 142 determines a communication score utilizing assembled contextual information and a set of conditions. In step 318, mediation program 142 compares the communication score to the established mediation threshold to determine whether the communication will be passed on to the recipient, for example person 104.

Figure 4:
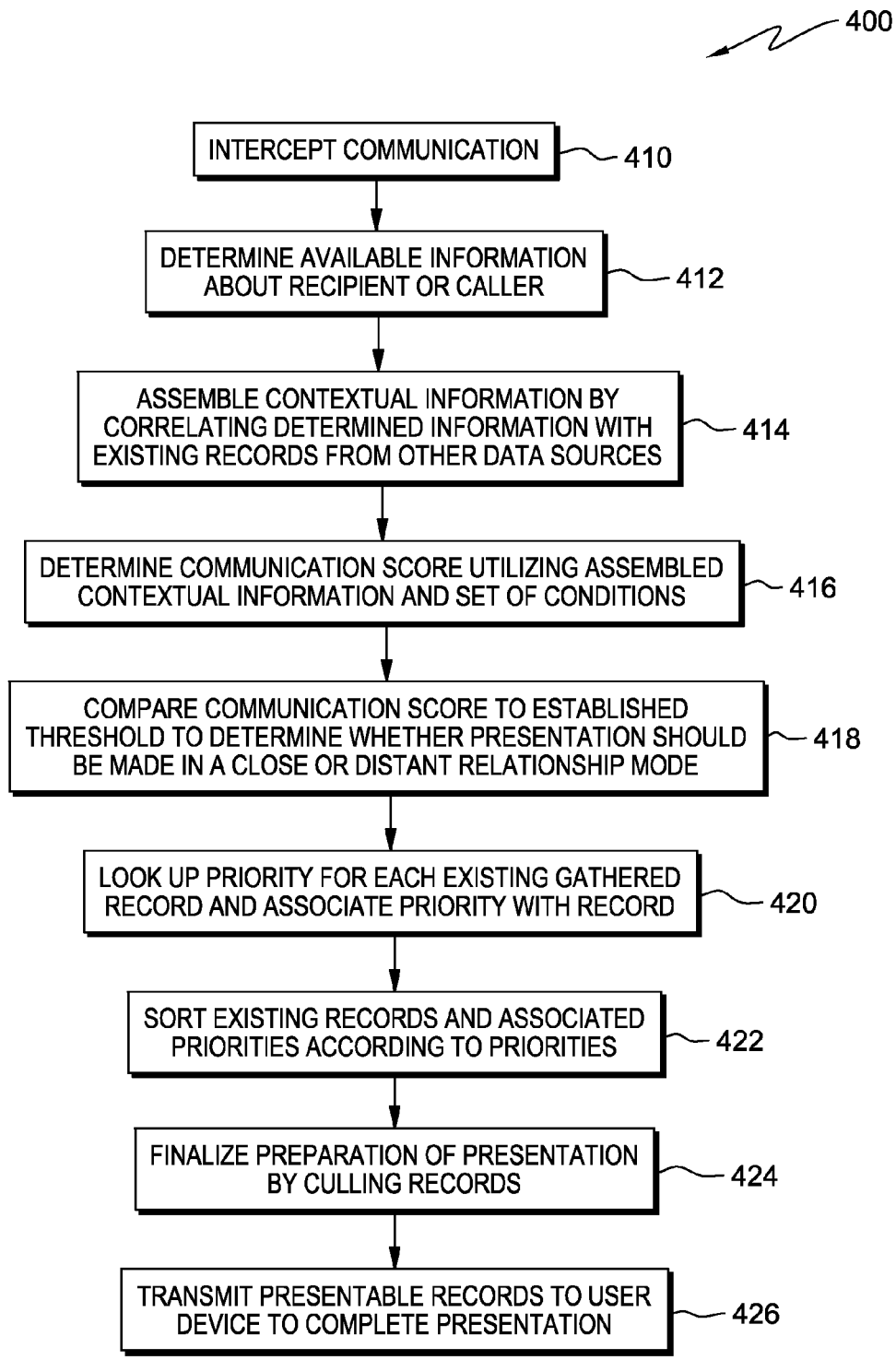
FIG. 4 includes a flowchart depicting the steps followed by caller presentation program 144 or recipient presentation program 146 in accordance with an embodiment of the present invention.

FIG. 4 includes flowchart 400 depicting steps followed by caller presentation program 144 or recipient presentation program 146, in accordance with an embodiment of the present invention. In step 410, caller presentation program 144 or recipient presentation program 146 of communication server 140 intercepts a communication, for example communication 160. In particular, caller presentation program 144 can, contemporaneously with or prior to the initiation of communication 160, begin in step 410. Further, recipient presentation program 146 can contemporaneously with the reception of communication 160, begin in step 410. In step 412, caller presentation program 144 or recipient presentation program 146 determines available information about the recipient or the caller, respectively, for example person 102 or person 104. In step 414, caller presentation program 144 or recipient presentation program 146 assembles contextual information by correlating determined information with existing records from other data sources, such as servers within servers 150. In step 416, caller presentation program 144 or recipient presentation program 146 determines a communication score utilizing assembled contextual information and a set of conditions. In step 418, caller presentation program 144 or recipient presentation program 146 compares the communication score to the established presentation threshold to determine whether a presentation of status should be made in a close relationship mode or a distant relationship mode.

In step 420, caller presentation program 144 or recipient presentation program 146 looks up a priority for each existing gathered record and associates the looked-up priority with each record. For example, caller presentation program 144 or recipient presentation program 146 can look up and associate a set of priorities 206 with a set of existing records 204. In step 422, caller presentation program 144 or recipient presentation program 146 sorts the existing records and associated priorities according to the priorities. In step 424, caller presentation program 144 or recipient presentation program 146 culls records, if necessary, to yield a set of presentable records, for example presentable records 212. In step 426, caller presentation program 144 or recipient presentation program 146 can transmit the presentable records to user device 120 or user device 130, respectively, to efficiently and effectively help make a decision whether to complete, make, or take a communication.

Figure 5:
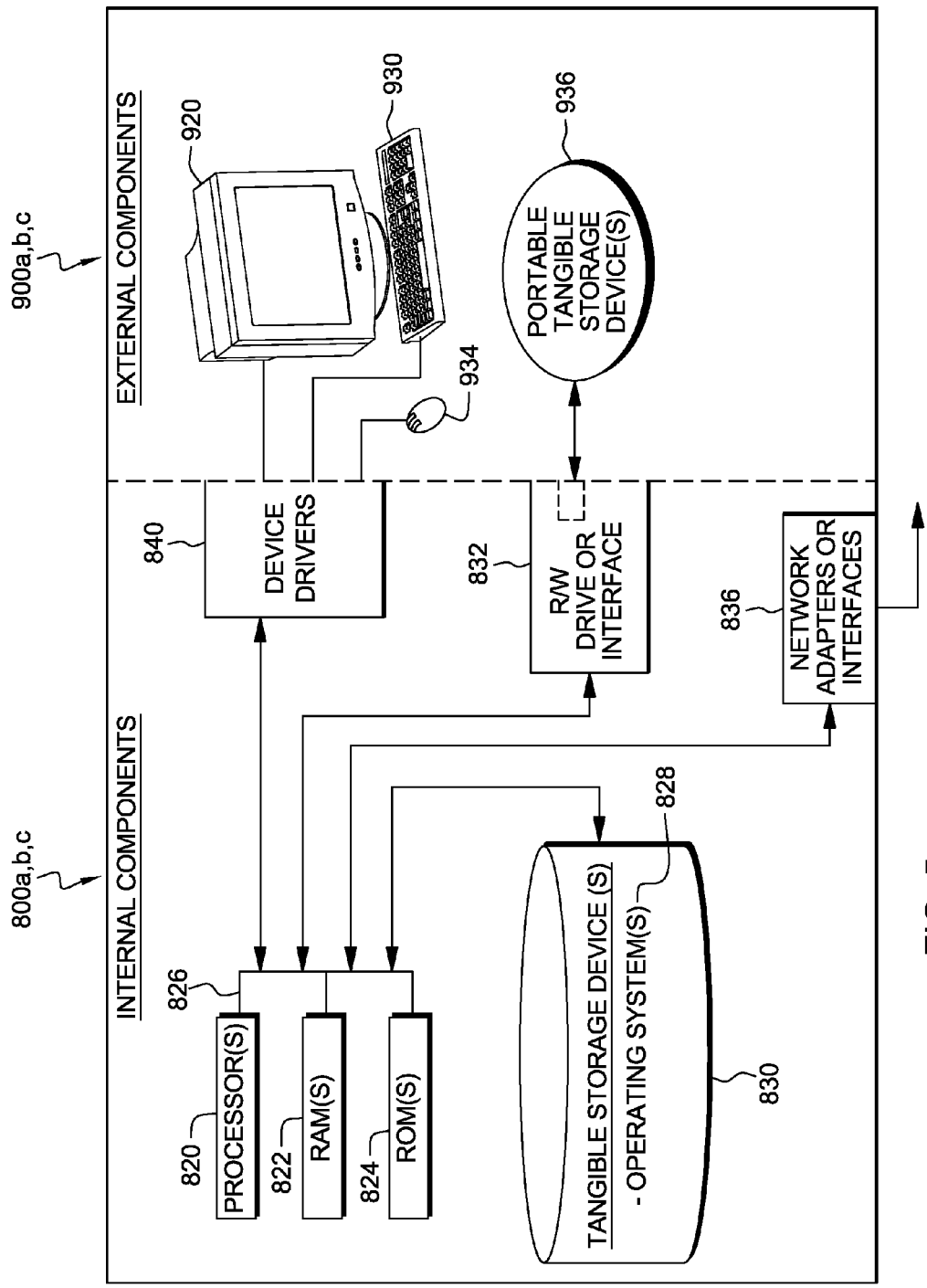
FIG. 5 is a block diagram of hardware and software within communications system 100 in accordance with an embodiment of the present invention.

FIG. 5 shows a block diagram of the components of a data processing system 800, 900, such as user device 120, user device 130, communication server 140, or one of servers 150, in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, a PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User device 120, user device 130, communication server 140, or one of servers 150 include respective sets of internal components 800 a, b, c and external components 900 a, b, c illustrated in FIG. 5. Each of the sets of internal components 800 a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, mediation program 142, caller presentation program 144, and recipient presentation program 146 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. Mediation program 142, caller presentation program 144, and recipient presentation program 146 can be stored on one or more of the respective portable computer-readable tangible storage devices 936, read via the respective R/W drive or interface 832 and loaded into the respective hard drive 830.

Each set of internal components 800 a, b, c also includes network adapters or interfaces 836 such as a TCP/IP adapter cards, wireless wi-fi interface cards, or 3G or 4G wireless interface cards or other wired or wireless communication links. Mediation program 142, caller presentation program 144, and recipient presentation program 146 can be downloaded to communication server 140 from an external computer via a network (for example, the Internet, a local area network or other, wide area network) and respective network adapters or interfaces 836. From the network adapters or interfaces 836, mediation program 142, caller presentation program 144, and recipient presentation program 146 are loaded into the respective hard drive 830. The network may comprise copper wires, optical fibers, wireless transmission, routers, firewalls, switches, gateway computers and/or edge servers.

Each of the sets of external components 900 a, b, c can include a computer display monitor 920, a keyboard 930, and a computer mouse 934. External components 900 a, b, c can also include touch screens, virtual keyboards, touch pads, pointing devices, and other human interface devices, for example. Each of the sets of internal components 800 a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation. The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

What is claimed is:

1. A computer-implemented method comprising the steps of:
    receiving a plurality of records each relevant to a relationship between a first person and a second person;
    determining a communication score of a communication from the first person to the second person, wherein the score is based on the relationship between the first person and the second person, the current status of the second person, and at least one of the plurality of records;
    comparing the communication score to an established mediation threshold; and
    responsive to determining that the communication score violates the established mediation threshold, passing the communication to a user device of the second person.

2. The method of claim 1, further comprising, responsive to determining that the communication score does not violate the established mediation threshold, prompting the first person for information.

3. The method of claim 1, further comprising:
    prioritizing the plurality of records according to a set of priorities, wherein the set of priorities is selected based on the relationship between the first person and the second person; and
    presenting the plurality of records.

4. The method of claim 3, further comprising comparing the communication score to an established presentation threshold to determine the set of priorities.

5. The method of claim 3, wherein the presenting includes presenting the plurality of records on a user device of the first person to assist the first person in judging the likelihood of a response to the communication by the second person.

6. The method of claim 3, wherein the presenting includes presenting the plurality of records on the user device of the second person to assist the second person in judging the utility of taking the communication.

7. The method of claim 3, further comprising culling the plurality of records to remove a lowest priority record.

8. The method of claim 1, wherein at least one record of the plurality of records is a record from a social network indicating a degree of separation of connections between the first person and the second person.

9. The method of claim 1, wherein at least one record of the plurality of records is a record of communication history between the first person and the second person.

10. The method of claim 1, further comprising:
    receiving the communication from the first person to the second person.

11. The method of claim 1, wherein the relationship between the first person and the second person is a social relationship.

12. The method of claim 1, wherein the current status of the second person includes, at least, an activity the second person is engaging in.

* * * * *